United States Patent [19]

Uchida

[11] Patent Number: 5,555,869
[45] Date of Patent: Sep. 17, 1996

[54] MULTI-VALVE ENGINE

[75] Inventor: Masahiro Uchida, Iwata, Japan

[73] Assignee: Yamaha Hatsudoki Kabushiki Kaisha, Iwata, Japan

[21] Appl. No.: 297,615

[22] Filed: Aug. 29, 1994

[30] Foreign Application Priority Data

Aug. 27, 1993 [JP] Japan .................................. 5-234341
Aug. 27, 1993 [JP] Japan .................................. 5-234342

[51] Int. Cl.$^6$ .................................................. F02B 15/00
[52] U.S. Cl. ............................................ 123/308; 123/432
[58] Field of Search ................................... 123/308, 432, 123/90.27, 193.5

[56] References Cited

U.S. PATENT DOCUMENTS

| | | | |
|---|---|---|---|
| 4,553,515 | 11/1985 | King et al. | 123/432 |
| 4,651,696 | 3/1987 | Yoshikawa et al. | 123/432 |
| 4,667,636 | 5/1987 | Oishi et al. | 123/432 |
| 4,995,359 | 2/1991 | Yokoyama et al. | 123/308 |
| 5,060,616 | 10/1991 | Nakagawa et al. | 123/432 |
| 5,097,805 | 3/1992 | Uesugi et al. | 123/90.27 |
| 5,099,812 | 3/1992 | Yamada | 123/432 |
| 5,119,785 | 6/1992 | Saito et al. | 123/432 |
| 5,184,581 | 2/1993 | Aoyama et al. | 123/90.27 |
| 5,231,961 | 8/1993 | Shimada et al. | 123/90.27 |

FOREIGN PATENT DOCUMENTS

| | | | |
|---|---|---|---|
| 58-172420 | 10/1983 | Japan | 123/432 |
| 3-202619 | 9/1991 | Japan | 123/308 |
| 4-81522 | 3/1992 | Japan | 123/308 |

Primary Examiner—David A. Okonsky
Attorney, Agent, or Firm—Knobbe, Martens, Olson & Bear

[57] ABSTRACT

A cylinder head and induction passage arrangement for a three intake valve internal combustion engine wherein the center intake passage and its porting arrangement is directed so as to augment the tumble action caused by the side valve seats and their intake passages. The construction also provides that the center intake valve will be disposed so that there will be no shrouded area in the path of flame from the spark plug so as to ensure complete combustion. The cylinder head is made in such a way that the same cylinder head may be used for either bank of an engine having angularly inclined cylinder banks through the machining of only one face thereof.

44 Claims, 12 Drawing Sheets

MULTI-VALVE ENGINE

BACKGROUND OF THE INVENTION

This invention relates to a multi-valve engine and more particularly to a improved cylinder head construction for such engines and an improved cylinder head that can be employed as either bank of a cylinder having angularly related cylinder banks and a method of manufacturing such a cylinder head.

The advantages of multi-valve internal combustion engines are well known. Frequently two intake valves are employed for introducing the charge into the combustion chambers of the engine. By employing two intake valves rather than one intake valve of the same diameter, it is possible to obtain improved charging efficiency and performance. The two smaller valves can be opened and closed at a more rapid rate and thus permit the engine to be operated at a higher speed and actually obtain better breathing than one large single intake valve.

Recognizing the advantages of multiple intake valves, most high performance engines presently employee two intake valves per cylinder. For the same reasons that two valves have an advantage over one, the use of three intake valves have a number of advantages and can offer still further improvements in performance.

One disadvantage with the use of three rather than two intake valves is that the valve placement can cause some difficulties. Specifically, when the number of intake valves is increased, it is difficult to maintain small combustion chamber surfaces and good thermal efficiency. In addition, the surface area of the combustion chamber may increase and this also makes it difficult to maintain high compression ratios.

An arrangement has been proposed, therefore, that uses three intake valves with two side valves being disposed so that they are intersected by a plane containing the cylinder bore axis but have the major portion of them lying on one side of the plane. A third center intake valve is positioned completely on this side of the plane and is disposed between the side intake valves. The center intake valve is disposed at the outer peripheral edge of the combustion chamber and in order to maintain high compression ratios this valve reciprocates about an axis that is disposed at a very small acute angle to the plane containing the cylinder bore axis.

With this type of arrangement, it is also the practice to employee a single centrally positioned spark plug. This means that the head of the side intake valve is disposed below the gap of the spark plug and hence there is a shielded area beneath this valve when the spark plug fires. This shielded area may preclude total flame propagation across the combustion chamber and can result in incomplete burning, loss of performance and reduced exhaust emission control.

It is, therefore, a principal object of this invention to provide an improved valve arrangement for a three intake valve per cylinder engine and wherein complete combustion can occur.

It is a further object of this invention to provide an improved placement for the center intake valve of a multi-valve engine wherein the center intake valve is disposed so that total flame travel is not retarded and complete combustion can be achieved.

It is a further object of the invention to provide an improved cylinder head and combustion chamber arrangement for a multi-valve engine.

Frequently in internal combustion engines and particularly those having angularly related cylinder banks, it is the practice to employ a common cylinder head casting for both of the cylinder banks. This cylinder head casting is positioned in one orientation on one cylinder bank and is rotated through 180° when attached to the other cylinder bank. This permits the induction system or exhaust system, whichever is preferred, to be disposed in the area between the cylinder banks. By using a common cylinder head casting, the number of different parts employed can be reduced and the cost therefore reduced accordingly.

In addition to using this concept on the banks of an engine having angularly related cylinder banks, with some applications it may be possible to mount the same cylinder head in either orientation on the same cylinder block and thus there may be advantages in employing one cylinder head that can be utilized with dissimilar cylinder blocks or the same cylinder block to orient the intake and exhaust passages in a different fashion.

When a common cylinder head casting is utilized and is rotated through 180° for mounting depending upon the application, certain problems or compromises must be encountered. For example, when the engine is provided with an overhead cam shaft it is the normal practice to have the cam shaft extend beyond one end of the cylinder head to establish its driving relationship with the engine crankshaft. However, if the cylinder head is designed to be mounted in either direction in the cylinder block, this means that the cam shaft journals at both ends of the block must extend to the end of the head. Thus, when the cam shaft does not extend beyond one end of the head, there is a sealing problem that arises at this end of the head. This has been accommodated normally by mounting a closure plate over the end of the cylinder head at this end but this obviously adds to the cost of the engine and its complexity. Furthermore, this brings a number of surfaces together all of them which must be sealed with respect to each other.

It is, therefore, a still further object of this invention to provide an improved cylinder head assembly that adapts itself to mounting in either of two orientations on a cylinder block while minimizing the sealing problems.

It is a further object of this invention to provide an improved method for forming a cylinder head which can be employed for mounting in either of two orientations on a cylinder block.

In engines having angularly related cylinder banks it is generally the practice to stagger one bank slightly relative to the other bank. This staggering is done so that corresponding connecting rods of the respective cylinder banks can be journaled on the same journal of the crankshaft. This permits a simpler crankshaft assembly and actually permits shortening of the overall length of the engine.

Where the cylinder block banks are staggered relative to each other and where a common cylinder head used for each bank, with the constructions heretofore proposed the cylinder heads have also been staggered relative to each other. Thus, if each cylinder head journals at least one overhead cam shaft then one of these cam shafts will be displaced rearwardly from the other due to the cylinder head configuration. This gives rise to difficulties in not only driving the cam shaft but also can complicate the overall engine structure, particularly when it is desired to mount the timing drive for the cam shafts within a common housing.

It is, therefore, a still further object of this invention to provide an improved cylinder head construction which permits mounting in either of two 180° displaced orientations and wherein one end of the cylinder head is configured so as to accommodate the offsetting when used with engines having two cylinder banks.

SUMMARY OF THE INVENTION

A first feature of this invention is adapted to be embodied in an internal combustion engine having a cylinder head with a lower surface that is adapted to form with an associated cylinder bore formed in a cylinder block and a piston reciprocating in the cylinder block a combustion chamber. Three valve seats are formed in the cylinder head surface which are comprised with a pair of side valve seats that are intersected by a plane containing the axis of the cylinder bore but which lie in substantial part on one side of the plane. A third, center valve seat is disposed between the pair of side valve seats and completely on the one side of the plane. Intake passages are formed in the cylinder head and terminate at the respective valve seats. Center and side poppet valves are supported for reciprocation by the cylinder head assembly for reciprocation about respective axes and cooperate with the respective center and side valve seats for controlling the flow therethrough. A spark plug is mounted in the cylinder head assembly with its gap disposed in the combustion chamber and protruding into the surface. The head of the center popper valve when in its closed position lies at no less of an angle to a plane perpendicular to the cylinder bore axis than a plane passing through the center of the gap of the spark plug and the lower peripheral edge of the center intake valve seat so that the area between the head of the center poppet plate intake valve and the piston does not mask a portion of the combustion chamber from flame travel upon the firing of the spark plug.

Another feature of the invention is adapted to be embodied in a cylinder head assembly for an internal combustion engine that is adapted to be mounted on a cylinder block in either of two positions disposed at 180° to each other. The cylinder head assembly forms a plurality of exhaust ports that extend along one side thereof and a plurality of intake ports that extend along the other side thereof. The cylinder head assembly is defined by a pair of end walls extending uninterruptedly between the sides at the ends of the cylinder head to define a valve actuating chamber for receiving and journaling at least one cam shaft for opening valves associated with the ports. Each of the end walls is formed with a bearing recess for journaling a respective bearing surface formed in the cam shaft and these bearing recesses terminate inwardly of the outer surface of the end walls.

In accordance with a structure for practicing the invention, one of the end walls has a portion removed so that the bearing surface extends through the outer periphery of the finished end wall.

In accordance with a method for practicing the invention, one of the end wall surfaces is machined sufficiently so as to open the cam shaft journal formed therein so that the cam shaft can extend beyond the journal and the end wall.

In accordance with another feature of the invention, each of the end walls is formed with a pair of end sealing surfaces adapted to be sealing engaged by a timing case cover. The end surfaces at one end of the cylinder head are spaced further from that end wall than at the other end of the cylinder head.

DETAILED DESCRIPTION OF THE PREFERRED EMBODIMENTS OF THE INVENTION

Figure 1:
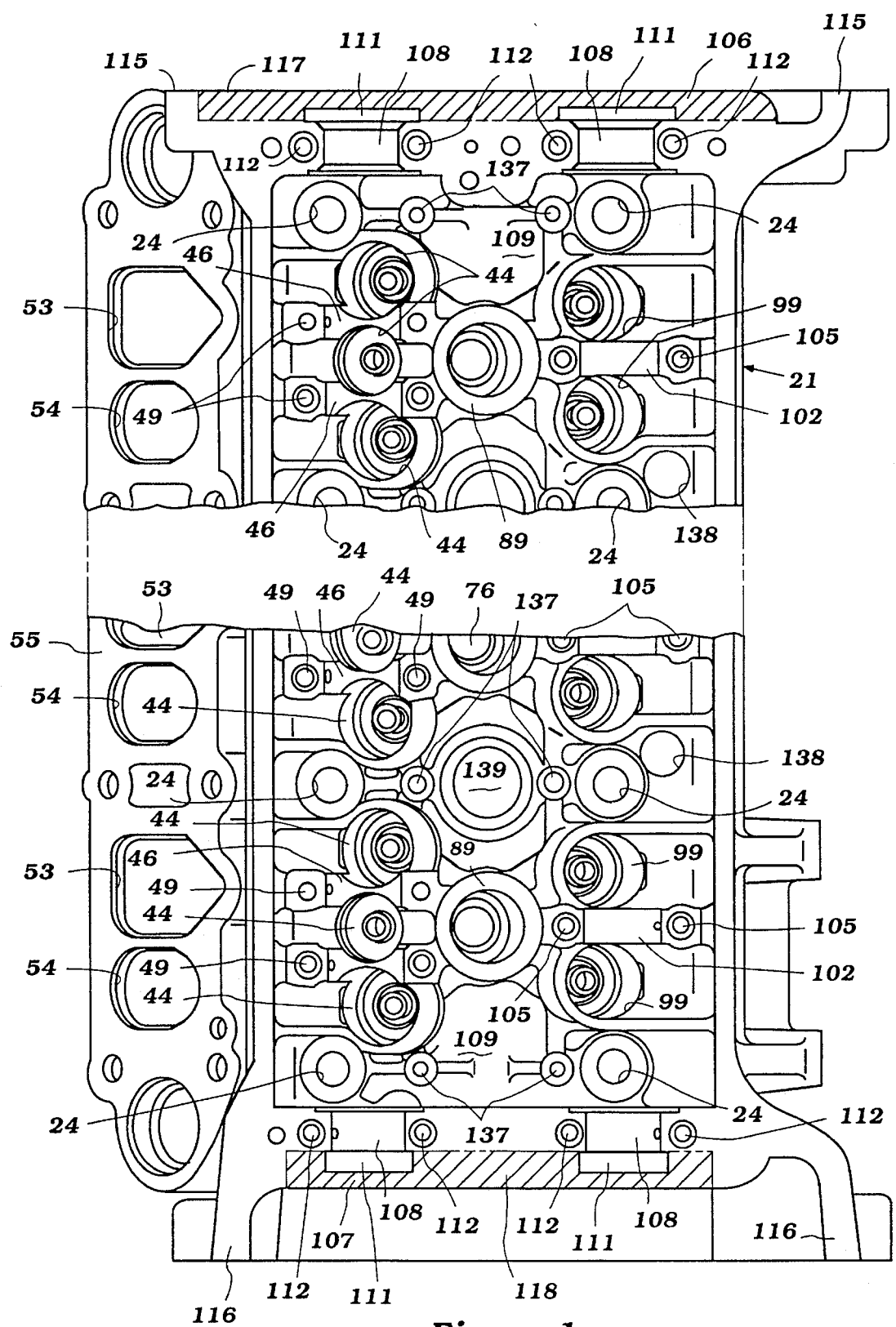
FIG. 1 is a top plan view of a cylinder head constructed in accordance with an embodiment of the invention, with the valves and valve actuating components removed to more clearly show the construction. In addition, portions of the end surfaces of the cylinder head are shaded to show how the cylinder head may be machined to operate on either bank of the engine having angularly related cylinder banks.

Referring now in detail to the drawings and initially primarily to FIGS. 1–4, a cylinder head constructed in accordance with an embodiment of the invention is identified generally by the reference numeral 21. In these figures, the cylinder head 21 is shown only in a partially machined condition, although the end face machining is indicated by shaded areas in FIG. 1, and this operation will be described later by reference primarily to FIG. 1 and FIGS. 13–15.

As will become apparent, the cylinder head 21 is designed so that it may be employed on either bank of an engine having a cylinder block with angularly disposed cylinder banks such as V-type or opposed engines. Although the machining construction and the way in which the casting of the cylinder head 21 is usable in conjunction with these features, it should be readily apparent to those skilled in the art that the cylinder head 21 may be readily used with in-line-type engines.

Also, although the cylinder head 21 is depicted as being associated with a cylinder block having four cylinder bores, it will also be apparent to those skilled in the art how the invention may be employed with engines having other numbers of cylinders. Finally, although the cylinder head 21 in the described embodiment is constructed as a single-piece casting, it should be also readily apparent to those skilled in the art how the invention can be employed with multiple-part cylinder head assemblies such as those having a main cylinder head casting and a cam carrier casting, which are affixed to each other.

The cylinder head 21 has a lower surface 22 that is adapted to be affixed, in a manner which will be described, to an associated cylinder block and has a plurality of spaced recessed surfaces 23 which cooperate with the cylinder block, cylinder bores formed therein, and pistons to form the combustion chambers of the engine. The cylinder head 21 is provided with a plurality of hold-down bolt holes 24 that are equally spaced around the combustion chamber recesses 23 and which are adapted to receive threaded fasteners for affixing the cylinder head 21 to the cylinder block in a well-known manner.

Figure 5:
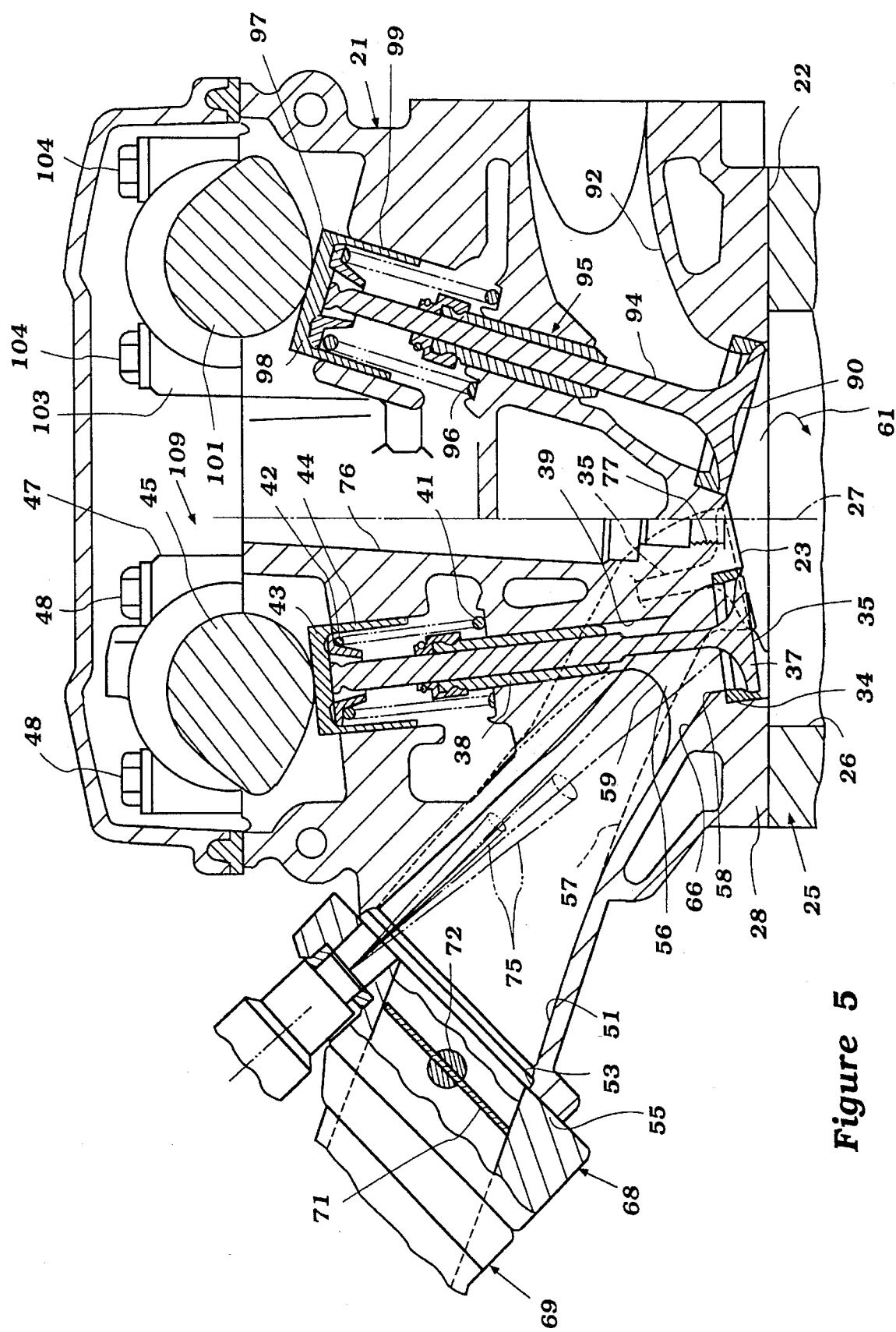
FIG. 5 is an enlarged cross-sectional view taken along the line 5—5 of FIG. 2.
Figure 6:
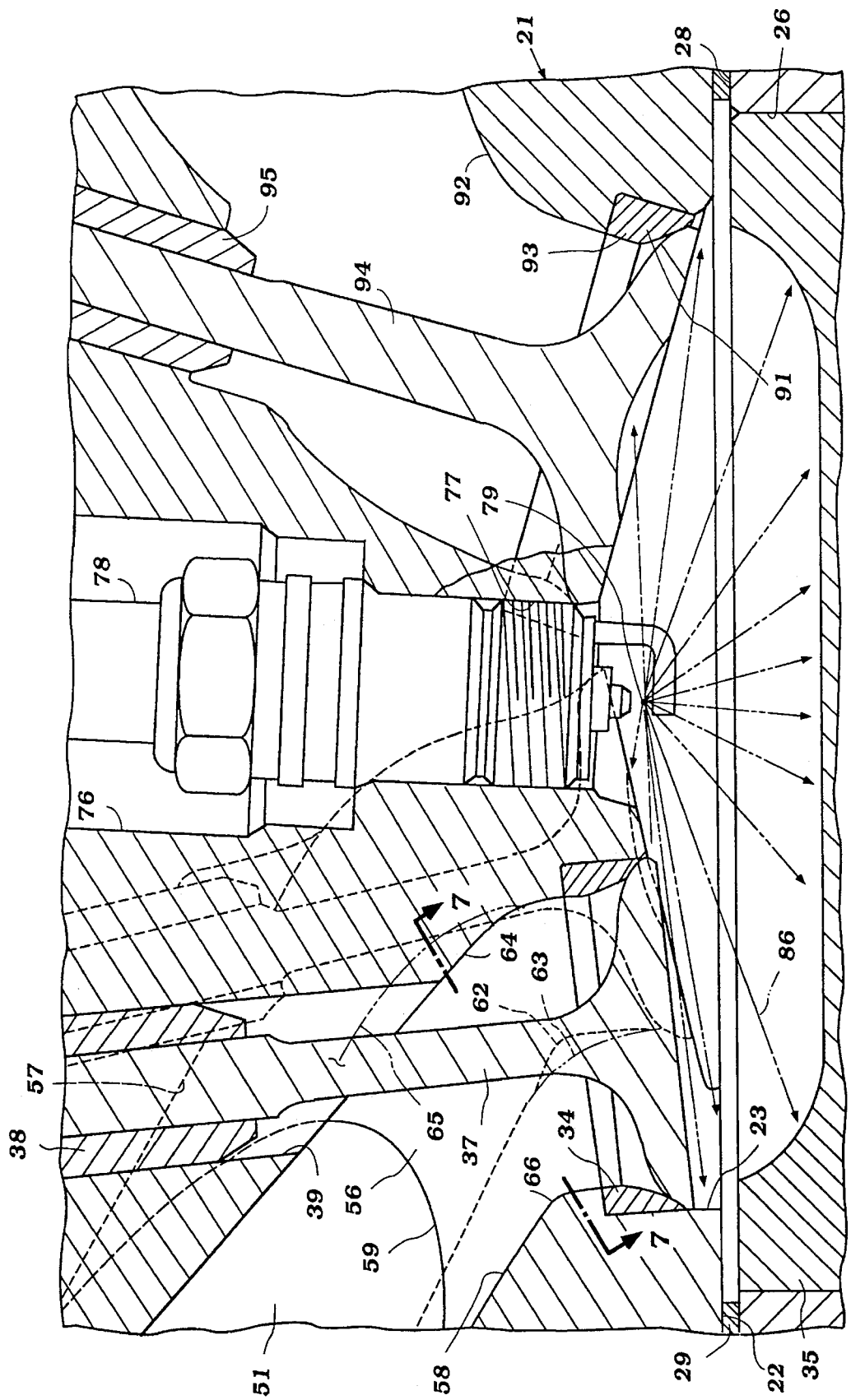
FIG. 6 is a view of the area of the cylinder head and center intake valve seat as shown in FIG. 5 but on an enlarged scale and showing the spark plug and spark plug gap to show how the flame can propagate to all portions of the combustion chamber.
Figure 7:
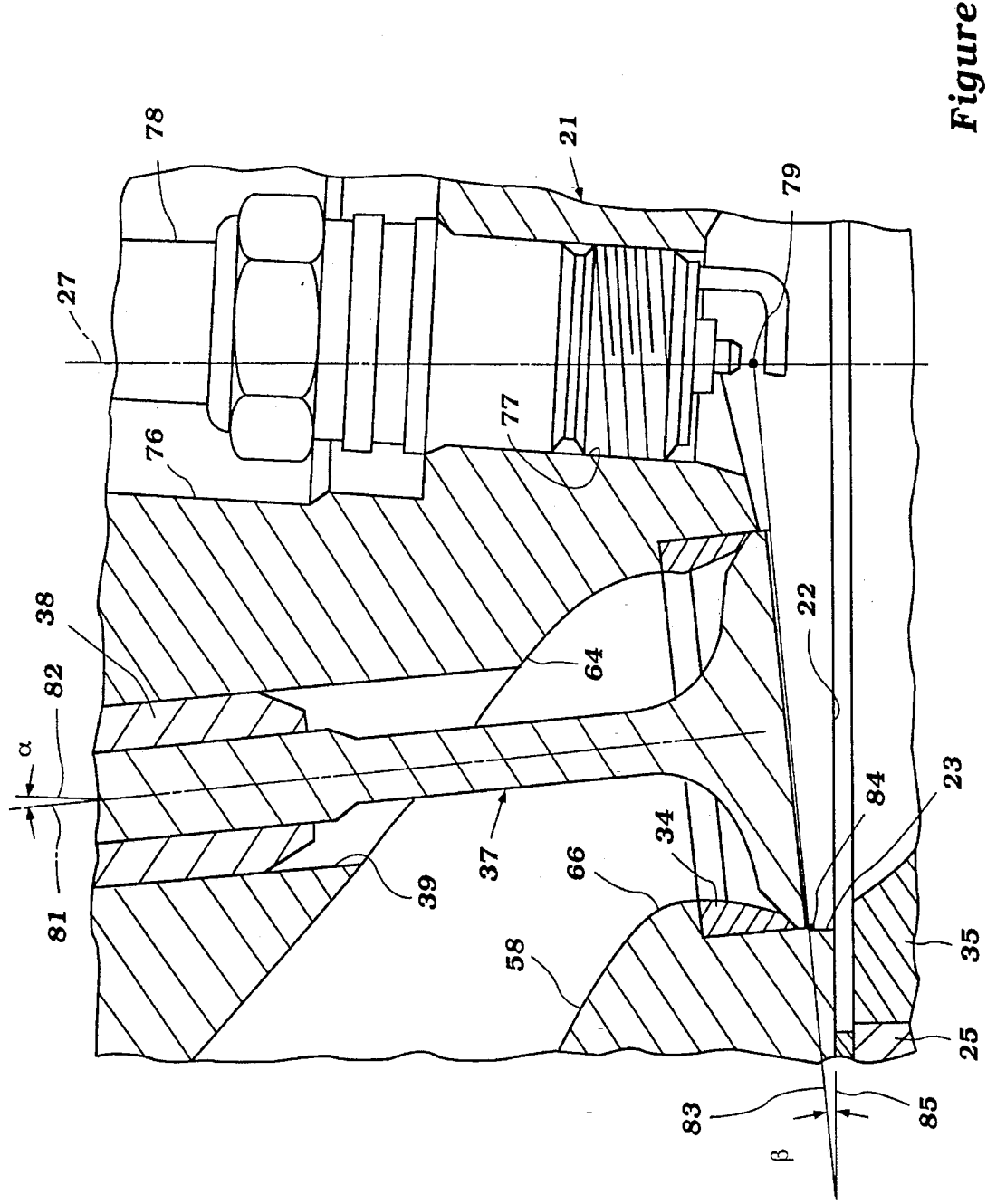
FIG. 7 is a still further enlarged cross-sectional view of the area shown in FIGS. 5 and 6 and shows certain geometric relationships in conjunction with aspects of the invention.
Figure 8:
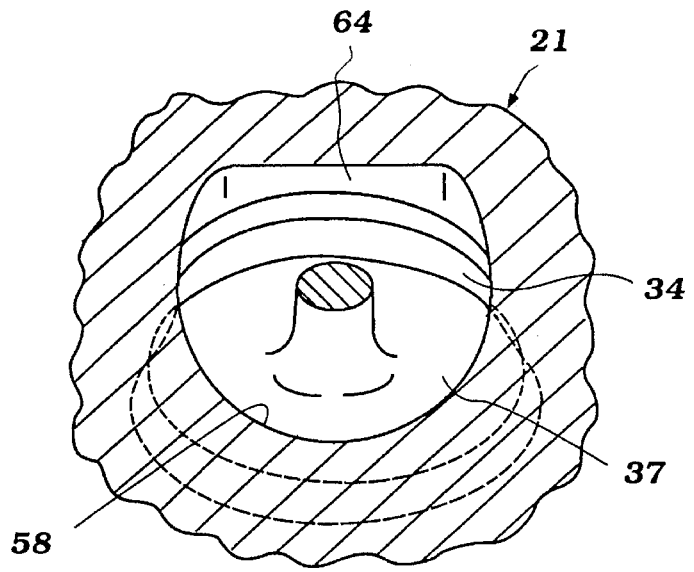
FIG. 8 is a cross-sectional view taken along the line 8—8 of FIG. 6 and shows the way in which the center intake passage is formed so as to promote the generation of tumble action.

Referring now additionally to FIGS. 5–11 and primarily to FIGS. 5–7, the cylinder block is depicted and is indicated generally by the reference numeral 25. As has been noted, the invention has particular utility with engines having angularly disposed cylinder banks, and the portion of the cylinder block 25 depicted may be one bank of a V-8 type of engine and which is formed with cylinder bores 26 each having a cylinder bore axis 27. The cylinder bores 26 mate with the cylinder head recesses 23 in a manner which will be described. As has been noted, the cylinder head surface 22 is in sealing relationship with a cylinder head surface 28, but in actuality a cylinder head gasket 29 (FIG. 8) is interposed therebetween for sealing surfaces. This cylinder head gasket 29 is not shown in all of the figures, but its use and type of construction can be of any well-known type.

Formed within the cylinder head recessed surface 23 are a plurality of intake valve seats comprised of a pair of side intake valve seats 31 and 32, and a center intake valve seat 33. As will become apparent, these valve seats 31, 32, and 33 are formed at the termination of respective intake passages formed in the cylinder head 21. Each valve seat 31, 32, and 33 is formed by a pressed-in insert, only one of which is shown in the drawings in detail and is identified by the reference numeral 34 in FIGS. 5–7. This is the valve seat insert 34 associated with the center valve seat 33, but it will be apparent to those skilled in the art that the construction of the valve seat inserts associated with the valve seats 31 and 32 can be of any known type.

It should be noted that the side intake valve seats 31 and 32 are intersected by a plane containing the axis of the cylinder bore 27 and which is parallel to or intersects the axis of a crankshaft (not shown) that is driven by pistons 35 (FIG. 6) that reciprocate in the cylinder bores 26. The pistons 35 are connected to the crankshaft by connecting rods in a well-known manner, and since the invention deals primarily with the shape of the combustion chamber, the intake passages and the cylinder head construction details of the engine which may be considered to be conventional are not illustrated.

The main portion of the side intake valve seats 31 and 32 lie on one side of this plane. The center intake valve seat 33 is, however, spaced further from this plane and is disposed generally between the side intake valve seats 31 and 32 and lies completely on the one side of the plane.

In the illustrated embodiment, the center intake valve seat 33 is substantially smaller in cross-sectional flow area than the side intake valve seats 31 and 32, although it may be smaller than only one of the side intake valve seats, such as the valve seat 32 with which it is paired in its induction system, as will be described. In a preferred relationship, the valve seat 32 is the largest and the valve seat 33 is the smallest and the valve seat 31 may be of an intermediate diameter or the same diameter as the valve seat 32.

A pair of side poppet-type intake valves 35 and 36 are supported in the cylinder head 21 in a manner to be described and have their head portions cooperating with the valve seats 31 and 32, respectively, to control the flow therethrough. In a similar manner, a center poppet-type intake valve 37 is supported for reciprocation in the cylinder head 21 in a manner which will also be described and has its head portion cooperating with the center intake valve seat 33 for controlling the flow therethrough. The heads of the intake valves 35, 36, and 37 are of the respective diameters as their respective valve seats 31, 32, and 33.

Each intake valve 35, 36, and 37 is supported for reciprocation within the cylinder head 21 in a manner as shown in FIG. 5 by means of a valve guide 38 that is pressed or otherwise fixed in a bore 39 formed in the cylinder head 21 in a manner which will be described later. The intake valves 35, 36, and 37 are all urged to their closed positions by means of valve springs 41 that operate against keeper retainer assemblies 42 and a machined surface of the cylinder head 21 to urge the intake valves 35, 36, and 37 to their closed position, as is well known in this art.

Thimble-type tappets 43 are slidably supported within respective bores 44 formed in the cylinder head 21 and are engaged with the lobes of an intake camshaft 44 that is journaled in the cylinder head 21 in a manner which will be described for opening the valves 21. It should be noted that since the diameter of the heads of the valves 35, 36, and 37 may be different, their masses will be different, and accordingly, the diameter of the springs 41 and thimble tappets 43 are proportioned to the respective valve mass. Said another way, the tappets 43 and valve springs 41 associated with the center intake valves 37 will be smaller than those with the side intake valves 35 and 36. The tappets 43 and springs 41 associated with the side intake valves 35 and 36 may be of the same or different diameters, depending upon the respective diameters of the heads of the valves 35 and 36.

The manner in which the intake camshaft 45 is driven will be described later by reference to FIGS. 13–15. However, as seen in FIG. 1, the cylinder head 21 is provided with a plurality of bearing surfaces 46 which extend between the tappet-receiving bores 44 for each cylinder, and these surfaces 46 form bearing surfaces that cooperate with corresponding bearing surfaces of the intake camshaft 45 to journal it in the cylinder head 21. Bearing caps 47 (FIG. 5) are affixed to the cylinder head 21 for cooperation with the bearing surfaces 46 by means of fasteners 48 that are received in tapped openings 49 formed in the cylinder head 21 for journaling the camshaft 45 in a well-known manner.

The intake passages that serve the intake valve seats 31, 32, and 33 will now be described by primary reference to FIGS. 1, 2, 5–8, 10, and 11. These intake passages are comprised of a primary intake passage, indicated generally by the reference numeral 51, which serves the center intake valve seat 31 and the side intake valve seat 32, and a secondary intake passage 52, which serves only the side intake valve seat 31. These intake passages 51 and 52 extend through the cylinder head 21 from the respective intake valve seats 32, 33, and 31 on the same side of the plane containing the cylinder bore axis 27 as the major portion of the valve seats and terminate in a primary intake port opening 53 and a secondary intake port opening 54 formed in an outer surface of the cylinder head 21, which surface is shown in most detail in FIG. 1 and is identified generally by the reference numeral 55.

Figure 10:
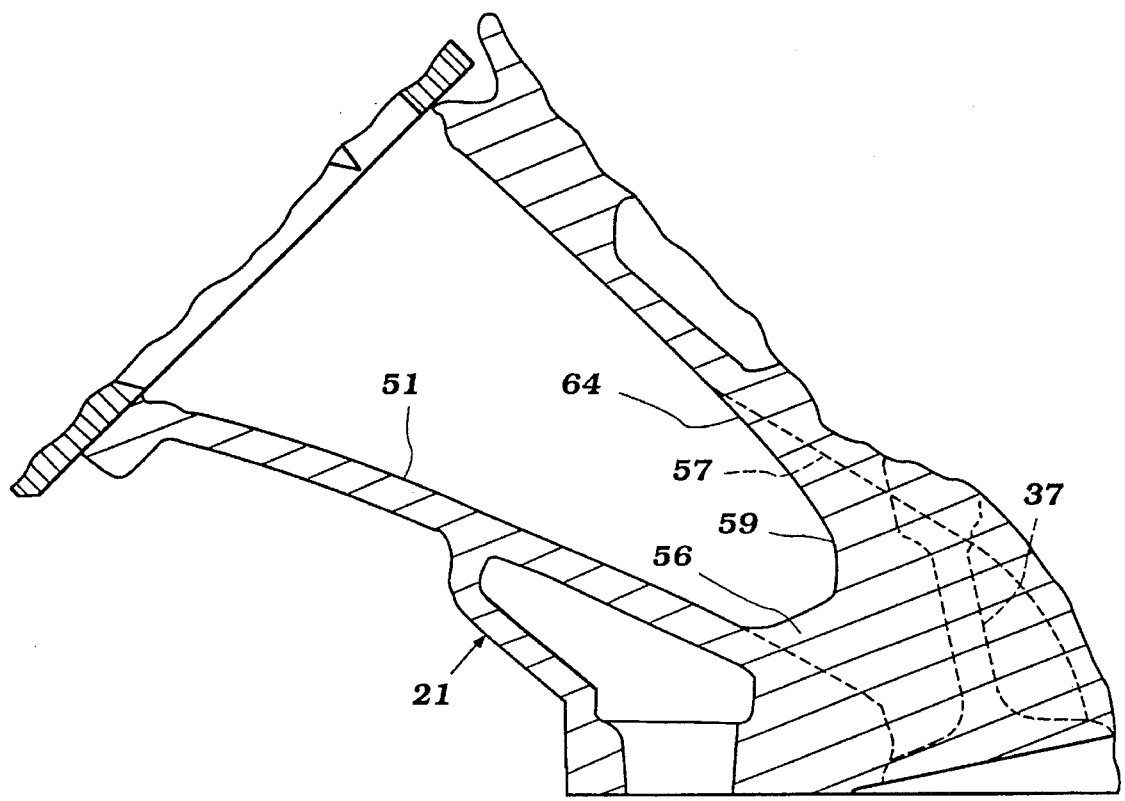
FIG. 10 is an enlarged cross-sectional view taken along the line 10—10 of FIG. 2.
Figure 11:
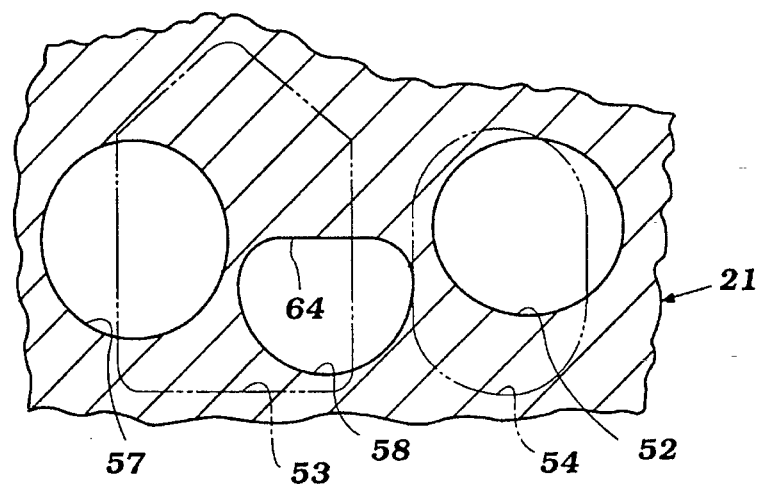
FIG. 11 is an enlarged cross-sectional view taken along the line 11—11 of FIG. 2.

The primary intake passage 51 is a Siamese type of passage, and thus is formed with a common portion that leads from the primary intake port 53 into the cylinder head 21, where it then meets a dividing wall 56, which divides the primary passage 51 into a side portion 57 and a center portion 58, which side and center portions 57 and 58 extend to the side valve seat 32 and center valve seat 33, respectively. The dividing wall 56 has an arcuate recess 59, as best shown in FIGS. 5 and 10, so as to provide a smooth transition. The dividing wall 56 extends generally in a vertical direction, so as to split the flow between the center passage 58 and the side passage 57.

It should be noted that the side passage 57 extends in a generally straight line and has a small curved portion that extends down to the side valve seat 32 so that a charge flowing from this side valve seat 32 will enter the combustion chamber, as shown by the arrow 61 in FIG. 5, to flow in a curved or tumbling fashion around an axis that extends perpendicular to the cylinder bore axis 27. The other side intake passage 52 that serves the valve seat 31 may be similarly configured so as to also promote this tumble action.

This curved section appears in FIG. 6 and is indicated by the dotted line 62, which is more steeply configured than a normal curved configuration, as shown by the phantom line 63. This assists in extenuating the direction of flow toward the cylinder bore axis 27 because it deflects more of the intake charge toward the side of the intake valve 36 on this side of the cylinder bore axis.

As has been previously noted, the type of configuration of the intake passage that serves the center intake valve seat 33, as used in the prior art constructions, tends to cause the flow to go in a generally axial direction, and hence, will set up a counter-tumble action opposing the tumble action 61. However, in accordance with a feature of the invention, the center intake passage 58 is configured so as to direct more of the flow toward the combustion chamber center side of the intake valve 37 so as to also create a tumble from this intake port 33 in the same direction as the arrow 61. The way this is done may be best understood by primary reference to FIGS. 6–8, 10, and 11.

It will be seen that the center intake passage 58 has its upper end cut off by a flattened portion, indicated generally at 64, so as to reduce the size of the center intake passage and accelerate the flow of the charge passing therethrough. The normal configuration is shown in FIG. 6 by the phantom line view 65. At the same time, the opposite side of the center intake passage 58 is formed with an abruptly curved portion 66, which tends to cause a restriction to flow on this side and to direct the flow toward the opposite side of the head of the center intake valve 37 so as to direct the flow in a way that it will cause the direction of discharge to be toward the cylinder bore axis 27, rather than parallel to it. As a result, this intake charge will also cause a tumble action in the combustion chamber in the direction of the arrow 61 so as to augment the total tumble action, rather than act against it with the prior art-type of constructions.

Figure 2:
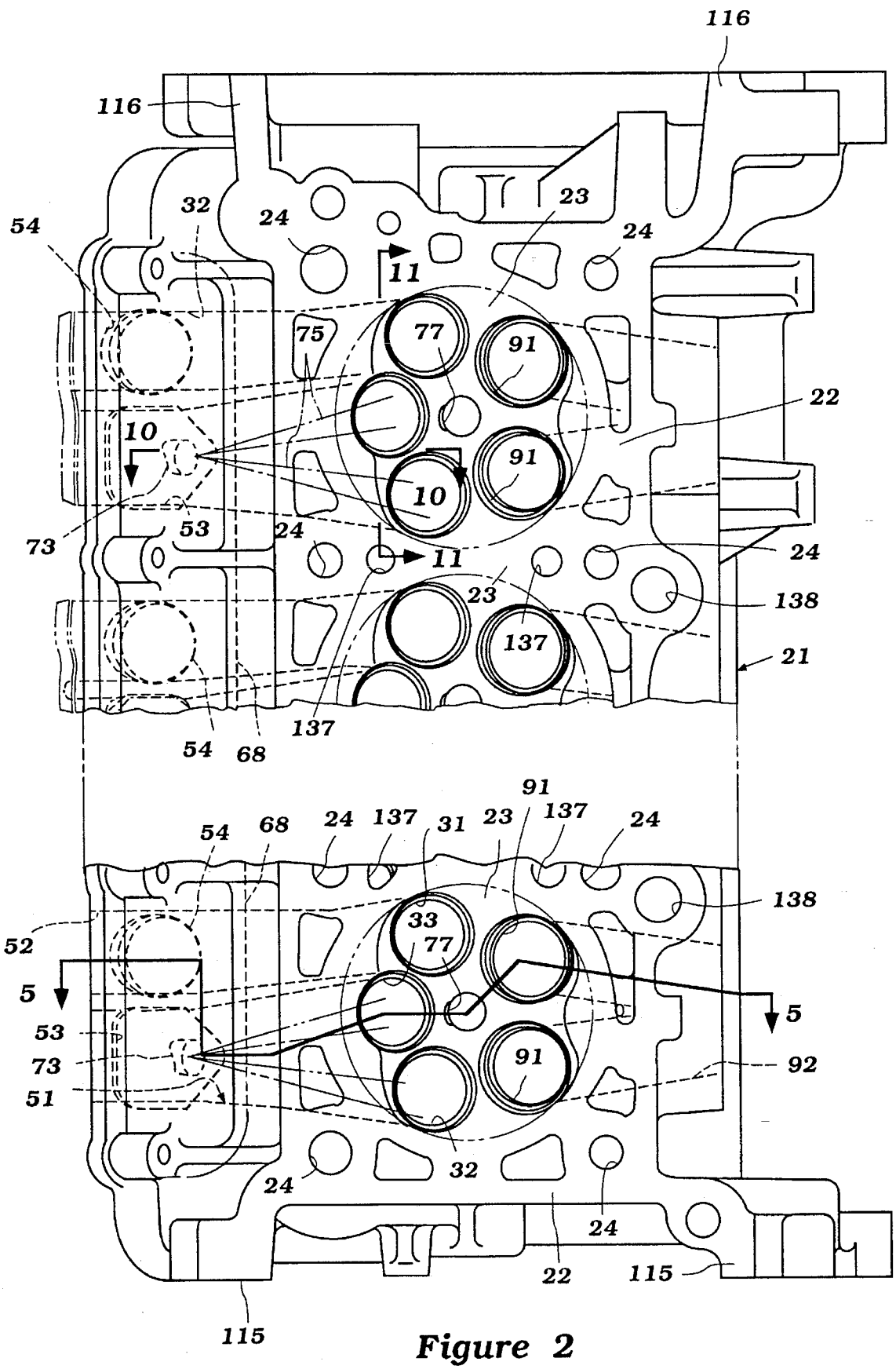
FIG. 2 is a bottom plan view of the cylinder head, again with the valves and valve-actuating components removed but with the fuel injectors shown in phantom so as to illustrate how their spray pattern into the cylinder is accomplished.
Figure 3:
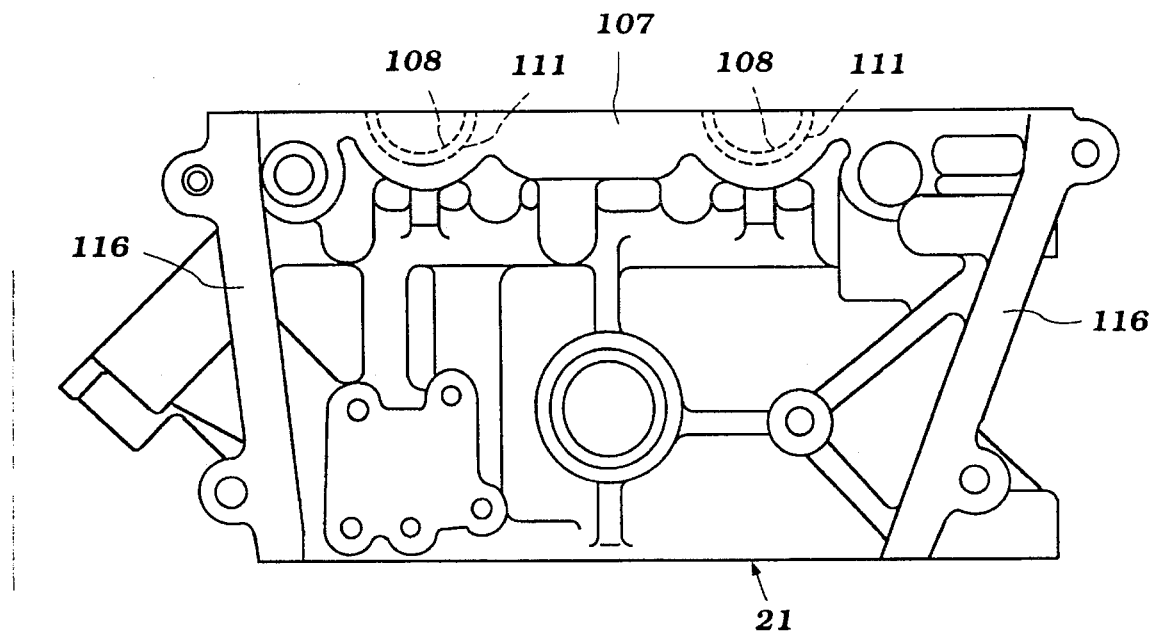
FIG. 3 is an end elevational view of the cylinder head, again with the valve and valve-actuating mechanism removed.
Figure 4:
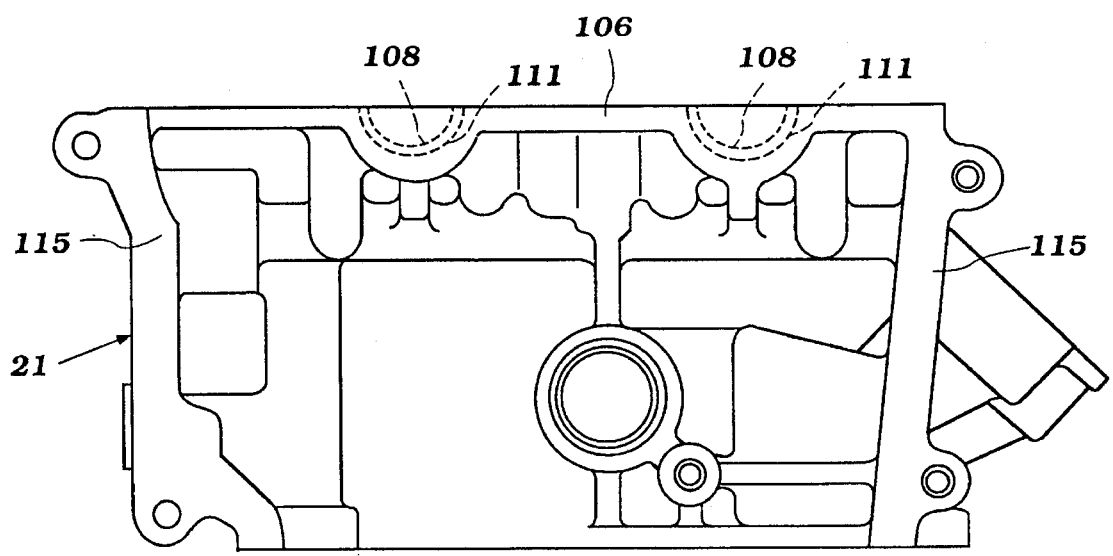
FIG. 4 is an end elevational view of the cylinder head as shown in FIG. 3 but looking in the opposite direction.

In order to further promote the flow of charge toward the center of the combustion chamber, the lower surface of the cylinder head 21 around the recess 23 is provided with a flat masking surface 67, which extends around a portion of the intake valve seat 33, as best shown in FIG. 2. This surface also is shown in greater extent in FIG. 9, and this, in effect, masks part of the intake valve seat 33 and forces the charge also to flow in the direction toward the cylinder bore axis 27 so as to improve this effect.

In addition to obtaining the tumble action, the induction system which supplies the charge to the primary and secondary intake passages 51 and 52 is constructed in such a way so as to also add a swirl component under some running conditions. The construction for achieving this is shown best in FIG. 5 and appears only partially therein. It should be noted that a control valve body assembly, indicated generally by the reference numeral 68, is affixed to the cylinder head 21 against the surface 55 and is interposed between the cylinder head 21 and an induction system, indicated generally by the reference numeral 69. The induction system 69 includes an intake manifold having a plurality of runners extending to the individual intake ports 53 and 54 and a plenum chamber, an air inlet device, and a manually operated throttle valve for controlling the engine speed. Any conventional type of induction system may be employed, and for this reason the system 69 is only shown partially, and further description of it is not believed to be necessary.

It should be noted that FIG. 5 is a sectional view taken along a line which first passes through the portion of the induction system which serves the secondary intake port 54 and then moves to the primary induction passage 51. A control valve 71 is provided in the body 68 on a control valve shaft 72 so as to control the flow through only the secondary intake passages 52. Generally, the control strategy for operating the control valves 71 is that they are maintained in a closed position under low load, low speed, and mid-range performance so that the charge enters the combustion chamber primarily through the side intake valve seat 32 and center intake valve seat 33. Hence, the charge is introduced primarily on one side of a plane that is perpendicular to the aforenoted plane and which also contains the cylinder bore axis 27 so as to generate a swirl in addition to the tumble action.

Figure 12:
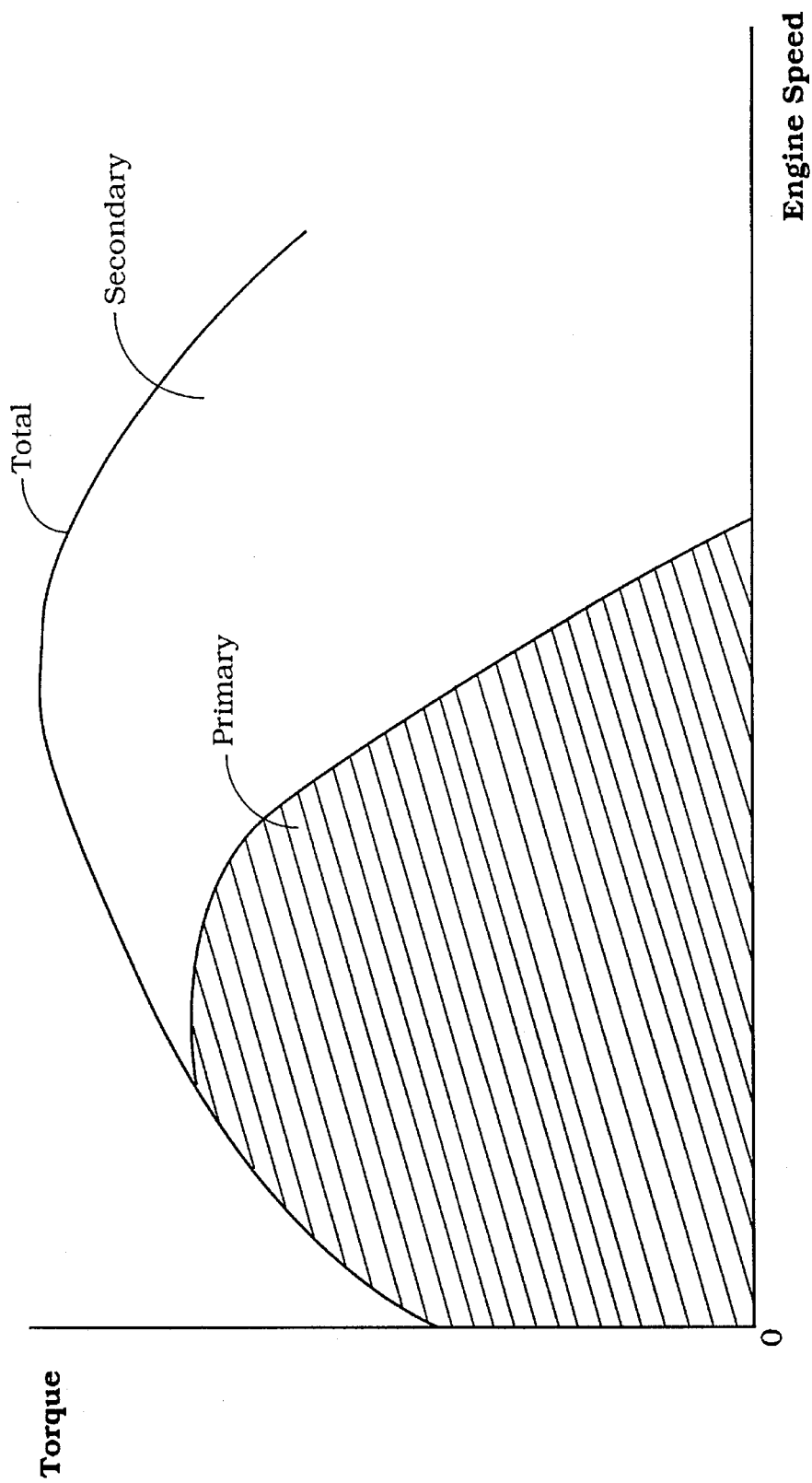
FIG. 12 is a graphical view showing the torque curves of the engine with the control valve opened and closed so as to explain the operation of the control valve.

This operation further increases turbulence and has an effect, as shown in FIG. 12, which is a torque to engine speed curve, with the shaded area indicated as the "Primary" torque curve generated when the control valves 71 are maintained in their closed position. As will be seen, a good torque curve is obtained under this condition at low and mid-range speeds, but the torque falls off as the engine speed increases, due to restriction in breathing capacity. Hence, by opening the control valves, the torque curve shown as "Total" is obtained, and the flow through the secondary passage 52 augments the primary flow and permits the obtaining of better high-speed and high-mid-range performance. However, if the control valves 71 were not employed, the torque at the low-speed end would deteriorate.

A fuel injector, indicated generally by the reference numeral 73, is mounted in the control valve body 68 and is disposed with an axis 74 located so that the spray patterns 75 will be directed into the side and center intake passages 57 and 58, respectively, as shown in FIGS. 2 and 5, so as to ensure that there will be good fuel distribution within the cylinder and adequate fuel for both branches of the primary intake passage 51.

A spark plug well, indicated generally by the reference numeral 76 and having a tapped opening 77 at its lower end, is formed in the cylinder head 21 and is adapted to receive a spark plug 78 with its spark gap 79 being disposed in the cylinder head recess area 23 substantially on the cylinder bore axis 27. It will be noted, however, that the spark plug well 76 is inclined away from the intake side of the cylinder head 21 so as to provide clearance for the intake valve assembly. As will be noted, there are more intake valves than exhaust valves, and as a result, it is desirable to incline the spark plug well 76 toward the exhaust side of the cylinder head.

As may be seen best in FIG. 1, the upper ends of the spark plug wells 76 define a ring-like area 89 which adds to the strength of the cylinder head.

In accordance with another feature of the invention, the center intake valve 37 is disposed so that its reciprocal axis, indicated by the reference numeral 81 in FIG. 7, is disposed to establish a relationship which will be described so as to avoid any masking of the portion of the combustion chamber under the head of the intake valve 31 from the flame travel. The axis 81 is defined, as aforenoted, by the valve guide 38 that supports the center intake valve 37. Because the intake passage 58 has a relatively flat surface 64, the bore 39 which receives the valve guide 38 may be drilled directly through the flat surface from the combustion chamber recess side 23 of the cylinder head 21. This is facilitated by the flat configuration of the intake passage area 64.

The valve guides for the side intake valve seats 31 and 32 are formed in a more conventional manner by forming an indentation through which the drilling takes place, as is conventional. However, because of the flat surface 64 of the intake passage 58, such indentations are not required for drilling the bore 39 to receive the guide 38 for the center intake valve 37.

Referring again to the disposition of the center intake valve 37, it is disposed at an angle α to a plane 82 (FIG. 7) that is parallel to the cylinder bore axis 27. The angle α is chosen so that the head of the center intake valve 37 will be inclined upwardly, as shown in FIG. 7, so that a plane 83 passing through the lower edge 84 of the valve seat 33 and the center of the spark gap 79 will be at an angle β to a horizontal plane 85 perpendicular to the cylinder bore axis 27, and that the head of the center intake valve 37 lies not below the plane 83 and not less than the angle β. As a result, when the spark plug is fired, as shown in FIG. 6, the flame may travel, as shown by the broken-line arrows 86, to the area beneath the center intake valve 37. With prior art type of constructions, the angle α was such that the head of the intake valve extended well below the plane 83 and less than the angle β, and hence, masked an area from flame travel and precluded complete combustion.

Figure 9:
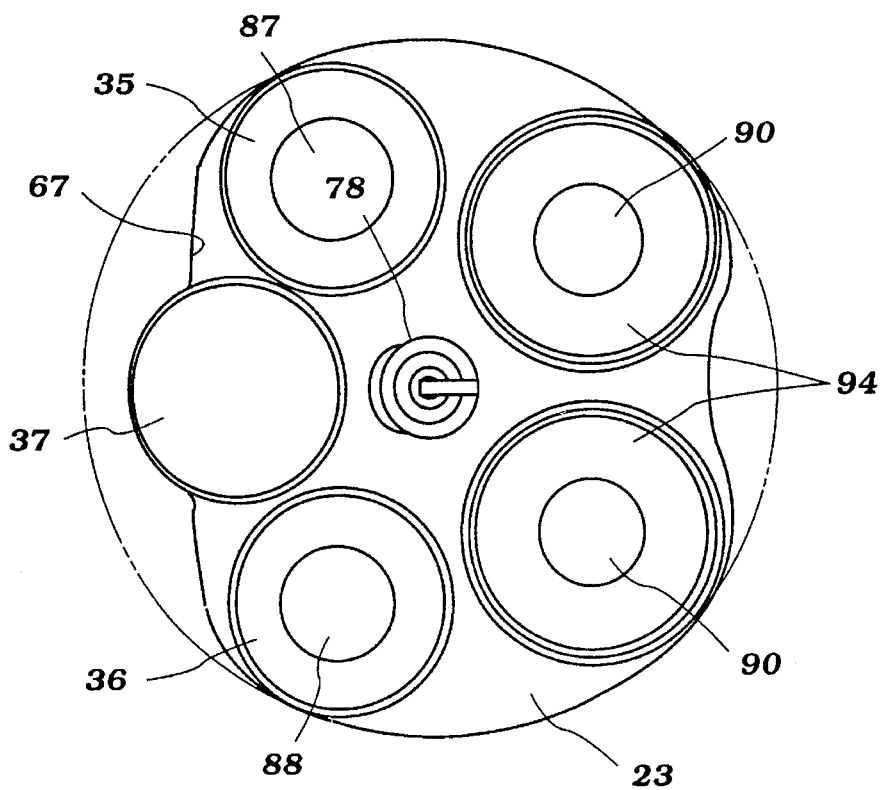
FIG. 9 is a bottom plan view, in part similar to FIG. 2, but shows the valves and spark plug in position in the cylinder head.

As may be seen in FIG. 9, it is conventional to cup the heads of the intake valves, as shown by the cups 87 and 88 formed in the intake valves 35 and 36. To further improve flame propagation and complete combustion, however, the head of the center intake valve 37 has no cupped area. However, if the angle α is chosen sufficiently large, then the center intake valve 37 may also be cupped, since the head of the intake valve 37 in this condition will be well-above the plane 83 at an angle greater than the angle β.

Referring now to FIGS. 2, 5, 6, and 9, the side of the aforenoted plane containing the cylinder bore axis opposite to the intake side thus far described comprises the exhaust side of the engine, and this is formed with a pair of exhaust valve seats 91 that are formed at the termination of a Siamese exhaust passage 92 that extends through the side of the cylinder head opposite the intake side for attachment to an exhaust manifold (not shown). Like the intake ports 91, the exhaust ports 92 are formed by exhaust valve seat inserts 93 that are pressed or otherwise affixed to the cylinder head 21. Poppet-type exhaust valves 94 are slidably supported in the cylinder head in valve guides 95 and control the flow through the exhaust valve seats 91.

The heads of the exhaust valves 94 are cupped, as at 90, so as to provide lighter weight. Again, since these heads face the combustion chamber recess 23 and are not obscured from the spark gap 79, there is no fear of masking of the cupped areas 90.

Coiled compression springs 96 engage the machined cylinder head surfaces at one end and keeper retainer assemblies 97 at the other end for urging the exhaust valves 94 to their closed positions. The exhaust valves 94 are opened by means of thimble tappets 98 that are slidably supported in bores 99 formed in the cylinder head 21. An exhaust camshaft 101 has cam lobes that cooperate with the tappets 98 for controlling the opening of the exhaust valves 94 in a known manner.

The cylinder head 21 is provided with bearing surfaces 102 that are disposed between the tappet bores 99 and which rotatably journal intermediate bearings of the camshaft 101. Bearing caps 103 are affixed to the cylinder head 21 by fasteners 104 that are tapped into threaded openings 105 formed in the cylinder head 21 on opposite sides of the bearing surfaces 102 for providing the intermediate journaling for the exhaust camshaft 101.

The end bearing relationship for the intake camshaft 45 and exhaust camshaft 101 and the manner in which these camshafts are driven will be described now by primary reference to FIGS. 1 and 13–15 although certain components do appear in the other figures.

FIG. 1 shows the configuration of the cylinder head 21 before finished machining to accommodate the camshaft journals and camshaft drive. This is so that it will be apparent how the described construction permits a single cylinder head casting to form the cylinder head 21 of either the right cylinder bank or the left cylinder bank of a V-type engine. This arrangement minimizes the number of parts and improves the sealing while at the same time permitting the use of a single cylinder head casting.

First, it should be noted that the cylinder head 21 is formed with a pair of end walls 106 and 107, each of which is formed with a machined bearing surface 108 that is disposed adjacent a cam chamber, indicated generally by the reference 109 and in which the valve actuating mechanism is contained. As will become apparent, these end walls 106 and 107 form outer peripheral edges of the cam chamber 109 and accommodate sealing for lubrication purposes, as will be described.

Adjacent each bearing surface 108, the cylinder head walls 106 and 107 are provided with further semicylindrical sections 111 that are of a larger diameter than those of the bearing surfaces 108. These surfaces 111 are disposed inwardly from the outer faces of the cylinder head end walls 106 and 107 for a reason which will be described.

Figure 14:
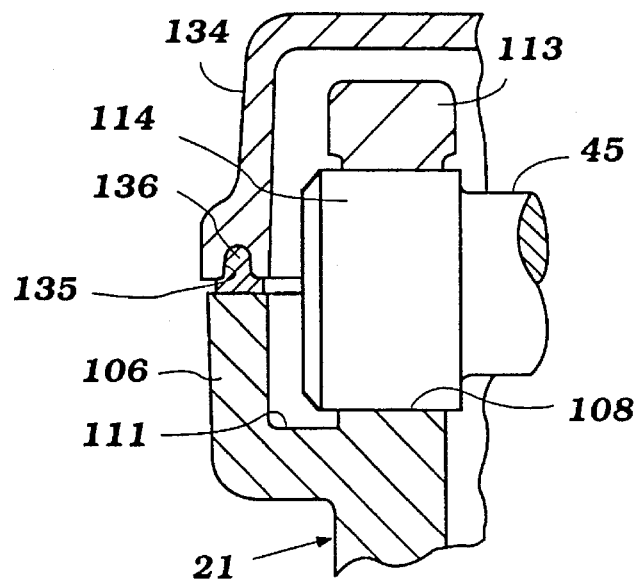
FIG. 14 is an enlarged cross-sectional view taken along the line 14—14 of FIG. 13.
Figure 15:
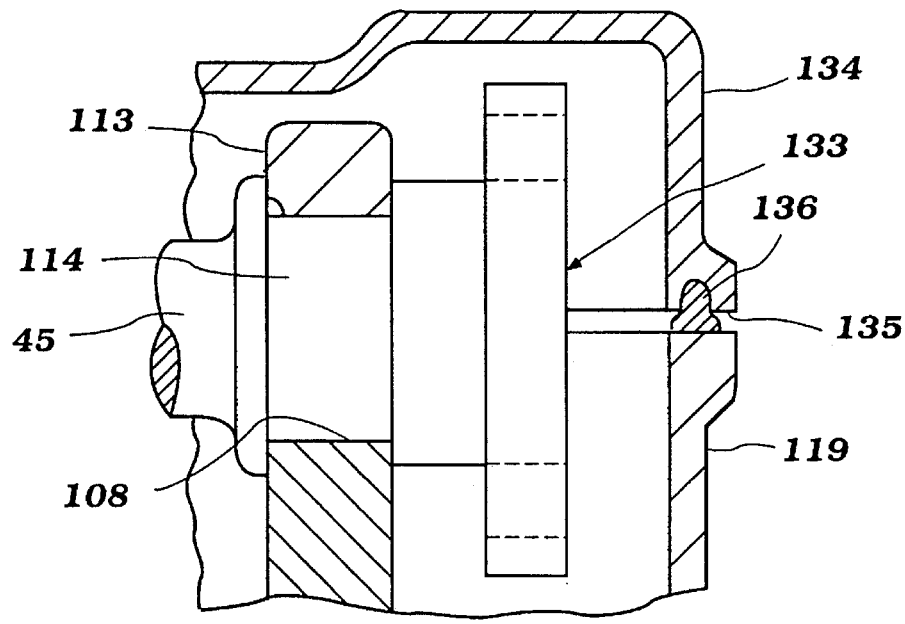
FIG. 15 is an enlarged cross-sectional view taken along the line 15—15 of FIG. 13.

Tapped openings 112 are formed on opposite sides of the bearing recesses 105 and are adapted to receive threaded fasteners (not shown) for affixing bearing caps 113 (FIGS. 14 and 15) to the cylinder head upper surfaces of the walls 106 and 107 so as to journal the end bearings 114 of the respective camshafts 45 and 101 with the intake camshaft 45 being shown in FIGS. 14 and 15. It should be readily apparent that the structure for journaling the exhaust camshafts 101 is the same.

It should be readily apparent that by not extending the bearing surfaces 108 completely through the walls 107 and 106 the ability to provide an oil seal at the end of the bearing surfaces 108 by the cam cover (to be described) and cylinder head 21 is possible. However, one end of the each of camshafts must extend through one of the wall 106 or 107 so as to be driven as clearly shown in FIG. 13 wherein the left hand cylinder head is identified as 21L and the right hand cylinder head is identified as 21R. This considering the right hand side of the drawing as being the front of the engine. This is made possible by permitting only a single machining operation of either the end wall 106 or the end wall 107 depending on whether the left or right hand cylinder bank is involved and the way in which this is done will now be explained further.

It should be noted that the end wall 106 of the cylinder head 21 is formed with a pair of end faces 115 which are substantially coextensive with the end wall 106 which may be spaced slightly outwardly from it. On the other end of the cylinder head 21, there are provided a further pair of end faces 116 which extend further away from the end wall 107 with this extension being done to accommodate the stagger between the cylinder banks.

As is well known with V-type engines or opposed engines, it is the practice to stagger one cylinder bank relative to the other so that the connecting rods associated with the corresponding pairs of cylinder can be journaled on the same journal of the crankshaft. This amount of stagger is indicated by the dimension L in the FIG. 13. The difference in the length of the end walls 115 and 116 is equal to the amount of stagger L for a reason which will now become apparent.

Considering first the left hand cylinder head 21L, this cylinder had may be considered to be the non-staggered cylinder head and in order to form the cylinder head casing to perform this function, a portion of the end wall 106, indicated at the shaded area 117 (FIG. 1) is machined away up until the bearing surface 108 so that the camshaft journal 114 may pass completely through this and a driving sprocket, shown at 118 in FIG. 15 may be attached to the extending end of the camshaft 45 or 101. The end wall 107 is not machined so that the opposite ends of the camshafts 45 and 101 will be received or adjacent the machined recesses 111, but these recesses will be closed by the remaining end wall 107.

Figure 13:
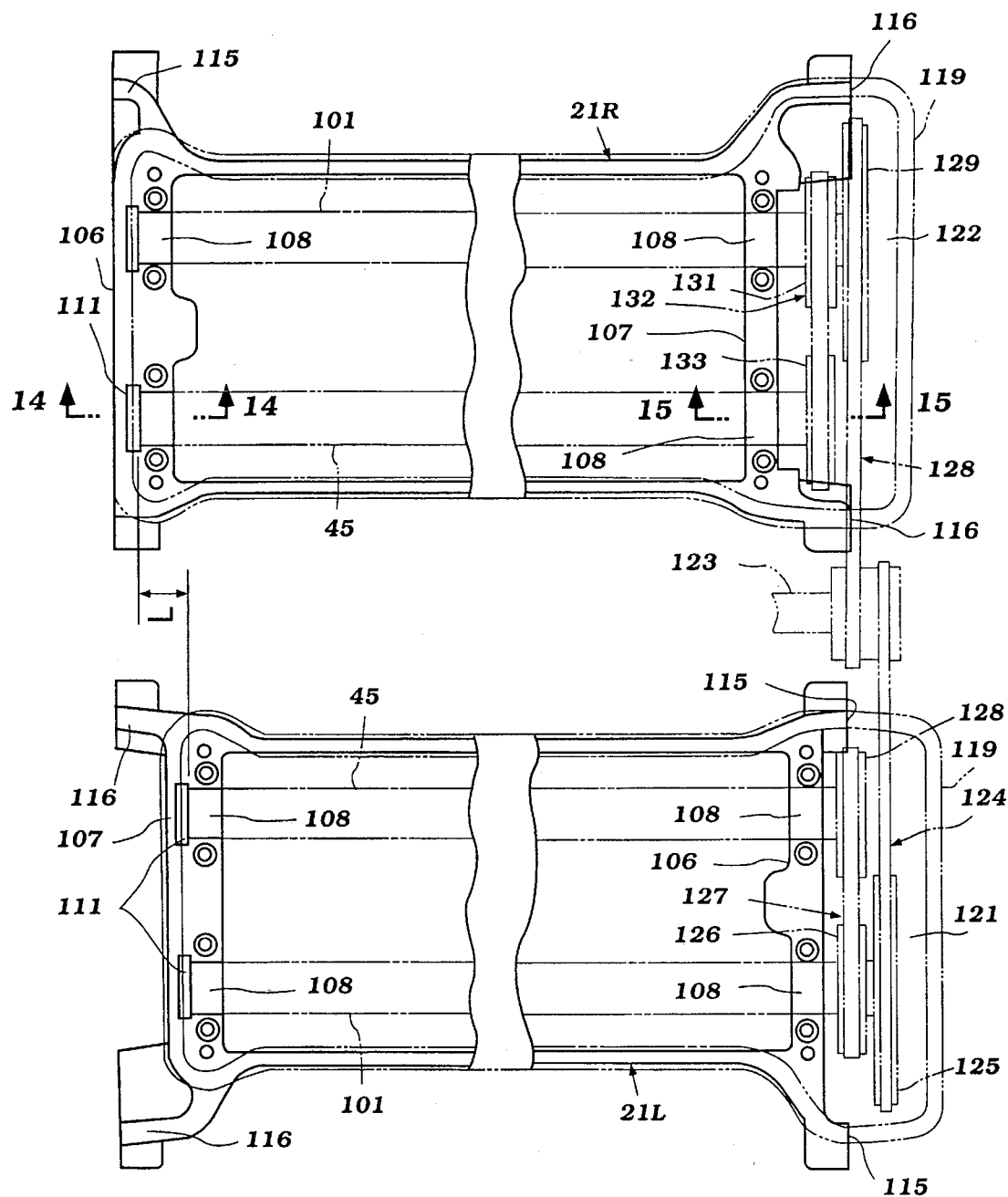
FIG. 13 is a top plan view of an engine embodying cylinder head of the type previously described as applied to both banks of the engine and shows how a single cylinder head casting may be employed for either bank.

In the engine configuration as shown in FIG. 13, the area between the cylinder heads 21L and 21R is the intake side of the engine. Therefore, the head 21R must be rotated through 180 degrees relative to the head 21L so that the intake ports 53 and 54 so both heads will be aligned with the area between the cylinder banks. This brings the wall 107 of the cylinder head 21R to the front of the engine and the extending end face flanges 116 will accommodate the stagger L between the cylinder banks as clearly shown in FIG. 13.

The portion of the end wall 107 is then machined off of the right hand cylinder head 21R as shown by the shaded area 118 in FIG. 1 so that the intake and exhaust camshafts 45 and 101 may extend forwardly beyond this wall 107.

It should be noted that a timing case cover 119 which may either comprise a one piece or a two piece assembly is affixed to the front side of the cylinder heads 21L and 21R so as to define timing cases 121 and 122 associated with the cylinder heads 21L and 21R, respectively. In order to illustrate the driving arrangements for the camshafts 45 and 101 for each cylinder bank, the crankshaft is shown schematically in this figure and is identified by the reference numeral 123.

A first timing chain or timing belt 124 is driven by the crankshaft 123 and drives a first sprocket 125 affixed to the end of the exhaust camshaft 101 of the cylinder head 21L. A second sprocket 126 is affixed to the exhaust camshaft 101 inwardly from the sprocket 125 and drives a further timing chain or a belt which, in turn, drives a sprocket 128 affixed to the front end of the intake camshaft 45 of the cylinder 21L.

A similar drive is provided for the camshafts 45 and 101 of the right hand cylinder bank 21R. This comprises a first timing chain or belt 128 which is driven from the crankshaft 123 and which drives a sprocket 129 affixed to the exhaust camshaft 101 of this bank outwardly of a further sprocket 131 also affixed to the exhaust camshaft 101. This sprocket 131 drives a timing chain or belt 132 which drives a sprocket 133 affixed to the intake camshaft 45 of this bank.

Thus, it should be seen that this construction permits a single cylinder head casting to be used for each bank and only one end of the cylinder head need be machined so as to accommodate the camshaft drive.

The sealing arrangement for sealing the cam chambers 109 will now be described by reference to FIGS. 5, 13, 14 and 15. It should be seen that a single cam cover for each cylinder head 21, indicated generally by the reference numeral 134 has a lower surface 135 which is machined with a groove to receive a sealing gasket 136. This gasket 136 engages the cylinder head wall 106 of the right hand cylinder head 21R and the wall 107 of the left hand cylinder head 21L outwardly of the bearing surfaces 108 of the cylinder head so as to provide sealing at this end of the engine. At the opposite end, the gaskets 136 engage the upper surfaces of the flanges 116 and 115, respectively of the cylinder heads 21R and 21L and the timing chain case 119 so as to complete the sealing arrangement at both ends of the head.

The cam cover 134 is held in place by a plurality of threaded fasteners that pass through bores 137 formed in the cylinder head 21 and are tapped into threaded openings formed in the cylinder block 25.

A suitable mechanism is provided for delivering lubricant to the valve actuating mechanism and oil drain holes 138 (FIG. 1) may be formed in the cylinder head 21 on the lower or exhaust side for draining the lubricant bank to the crankcase or the engine in a well known manner.

Finally, the cylinder head 21 is water cooled and is provided with cooling jackets that are formed by a core during the casting process. The sand for this core is removed through a clean out opening 139 in the cylinder head casting 21 which opening is then closed by a freeze plug, as is well known in this art.

Figure 16:
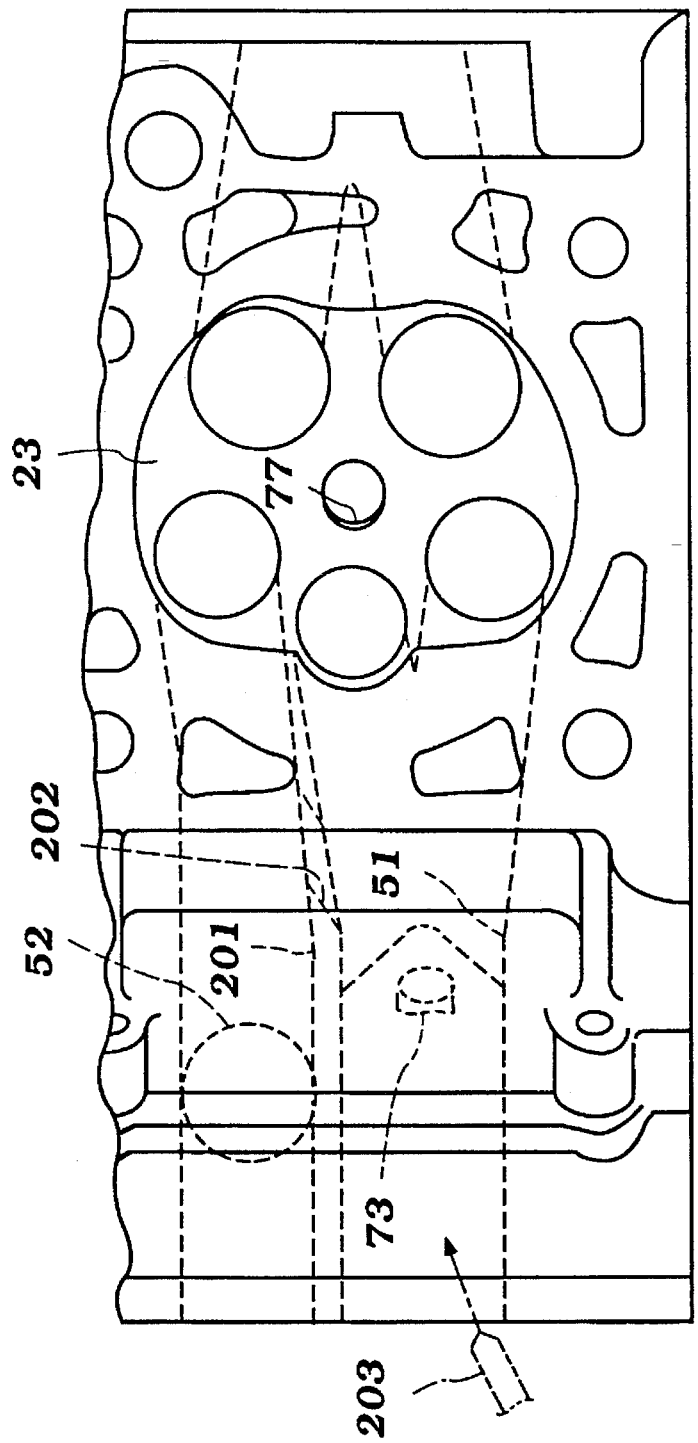
FIG. 16 is a partial bottom plan view, in part similar to FIG. 2, and shows another embodiment of the invention.

In the embodiment of this invention as thus far described, the primary intake passage 51 was isolated from the secondary intake passage 52 and all fuel was injected into the primary intake passage 51 by the fuel injector 73. Thus, when the control valves 71 were closed, even though the side intake valve 35 would open and close, there would be no flow through it. This could cause some pumping losses and FIG. 16 shows another embodiment of the invention which will permit some fuel also to flow through the secondary intake passage and also will permit airflow for cooling purposes of the intake valve 35.

Since the construction of this embodiment is the same as that previously described, except for this difference, components which are the same have been identified by the same reference numerals and will not be described again, except insofar as is necessary to understand the construction and operation of this embodiment. In this embodiment, it will be noted that the dividing wall 201 between the primary and secondary intake passages 51 and 52 is provided with a drilled opening 202 that can be formed by passing a drill bit 203 shown in phantom in FIG. 16 through the intake port 53 of the primary intake passage 51.

The opening 202 thus extends from the intake passage 51 to the secondary intake passage 52 in a downstream direction so that, if desired, fuel injected by the fuel injector 73 may also have a nozzle portion faced through the drilled opening 201. In any event, when the intake valve 35 opens and closes flow will take pace through the secondary intake passage 52 even though the control valve 71 is closed. The amount of flow will, however, be restricted so that the swirl action generated when the control valve 71 is closed will not be substantially diminished.

It should be readily apparent from the foregoing description that the described embodiments of the invention are very effective in providing a multi-valve cylinder head arrangement wherein a high compression ratio can be maintained and the center intake valve is still oriented so that no portion of the combustion chamber will be shielded from the flame traveled when the spark plug is fired. In addition, the cylinder head construction permits the use of a single cylinder head assembly that can be used in either of two orientations with a minimum of machining and with simplified and more effective sealing for the cam shaft journal. In addition, the cylinder head end faces are formed so that the reversal of the cylinder head on the cylinder block will compensate for the offset in the cylinder bank.

Of course, the foregoing description is that of the preferred embodiments of the invention and various changes and modifications may be made without departing from the spirit and scope of the invention as defined by the appended claims.

I claim:

1. A cylinder head assembly for an internal combustion engine having a lower surface adapted to cooperate with an associated cylinder bore in a cylinder block and a piston reciprocating therein to form a combustion chamber, a pair of side intake valve seats formed in said cylinder head surface and intersected by a plane containing the axis of the cylinder bore and lying substantially on one side of the plane, a center intake valve seat formed in said surface and disposed between said side intake valve seats and disposed completely on said one side of said plane, intake passages means formed in said cylinder head assembly and terminating at said valve seats, a spark plug mounted in said cylinder head assembly with its gap disposed in said combustion chamber, a plurality of poppet valves comprised of a pair of side poppet valves and a center poppet valve each having head portions adapted to control the flow through respective of the side and center intake valve seats, said valve head portions being connected to respective stem portions, each mounted for reciprocation in said cylinder head assembly, said side intake valves having their reciprocal axes disposed at a greater acute angle to the cylinder bore axis than said center intake valve, the lower surface of the head of said center poppet valve when in its closed position lying at an angle to a plane extending perpendicular to the cylinder bore axis no less than that of a plane passing between the lower peripheral edge of said center intake valve seat and the center of the gap of said spark plug so that the center poppet type intake valve does not mask any portion of the combustion chamber from flame travel upon the firing of said spark plug.

2. A cylinder head assembly as set forth in claim 1, wherein the head of the center intake valve is not cupped so as to further ensure against any area shrouded from combustion.

3. A cylinder head assembly as set forth in claim 2, wherein the heads of the side intake valves are cupped.

4. A cylinder head assembly as set forth in claim 2, wherein the axis of reciprocation of the center intake valve is disposed so that the plane of the lower surface of its head is disposed at a greater angle to the plane perpendicular to the cylinder bore axis than the plane passing between the lower peripheral edge of the center intake valve seat and the center of the gap of the spark plug.

5. A cylinder head assembly as set forth in claim 1, wherein the center intake passage serving the center intake valve seat is configured for directing the flow from said center intake valve seat toward the plane containing the cylinder bore axis and being substantially smaller in cross sectional area than at least one of the side intake passages serving one of the side intake valve seats for generating a tumble motion to the intake charge flowing from the center valve seat in the combustion chamber.

6. A cylinder head assembly as set forth in claim 5, wherein the center intake passage is formed with a flat section opening through an outer side of the cylinder head and terminating in a curved portion extending to the center intake valve seat, the upper surface of said curved portion being generally planar for directing the flow generally toward the side of the intake valve seat closest to the cylinder bore axis and for restricting the flow therethrough and thereby increasing the velocity of the intake charge flowing therethrough.

7. A cylinder head assembly as set forth in claim 5, wherein the side of the center intake passage facing the flat section is formed with a sharply curved flow restriction for reducing the flow through that side of the center intake passage.

8. A cylinder head assembly as set forth in claim 7, wherein the cylinder head surface has a portion surrounding and masking the portion of the center intake valve seat spaced furthest from the cylinder bore axis.

9. A cylinder head assembly as set forth in claim 5, wherein the cylinder head surface has a portion surrounding and masking the portion of the center intake valve seat spaced furthest from the plane.

10. A cylinder head assembly as set forth in claim 9, wherein the side of the center intake passage spaced further from the plane is formed with a sharply curved flow restriction for reducing the flow through that side of the center intake passage.

11. A cylinder head assembly as set forth in claim 5, wherein one of the side intake passages and the center intake passage have a common inlet portion and are separated from each other adjacent their respective valve seats by a dividing wall formed integrally in the cylinder head assembly.

12. A cylinder head assembly as set forth in claim 11, wherein the center intake passage is formed with a straight section opening through an outer side of the cylinder head and terminating in a curved portion extending to the center intake valve seat, the upper surface of said curved portion being generally flat for directing the flow generally toward the side of the intake valve seat closest to the cylinder bore axis and for restricting the flow therethrough and thereby increasing the velocity of the intake charge flowing therethrough.

13. A cylinder head assembly as set forth in claim 11, wherein the other side intake valve seat is served by a side intake passage that is not common with the common intake passage serving the center and one side valve seat.

14. A cylinder head assembly as set forth in claim 13, further including a control valve in said other side intake passage for controlling the flow therethrough in response to an engine running condition.

15. A cylinder head assembly as set forth in claim 13, wherein the cylinder head assembly is adapted to be utilized on a cylinder block in either of two 180° displaced positions from each other and wherein the cylinder head assembly has a plurality of lower surfaces each forming a respective combustion chamber with an associated cylinder bore and a cylinder block and wherein the cylinder head assembly defines a pair of end walls extending uninterruptedly between the sides at the ends thereof to define a valve actuating chamber for receiving and journaling at least one cam shaft for operating the valves associated with the valve seats, each of said end walls forming a bearing recess for journaling a respective bearing surface formed on the cam shaft, said bearing recesses terminating inwardly of the outer surfaces of said end walls, at least one of said end walls having a portion machined away so that the respective bearing recess at the end thereof extends completely through said one end wall for passing an end of said cam shaft for driving said cam shaft.

16. A cylinder head assembly as set forth in claim 15, wherein the cylinder head surfaces are formed with at least one exhaust valve seat the flow through which is controlled by at least one poppet type exhaust valve and further including a second cam shaft for operating the exhaust poppet valves, said end walls forming further bearing recesses for journaling respective bearing surfaces formed on said exhaust cam shaft and which terminate inwardly of the outer surfaces of said end walls, the at least one of said end walls machined away portion also causing the bearing recess for the exhaust cam shaft to pass completely through said one end wall for driving of said exhaust cam shaft.

17. A cylinder head assembly as set forth in claim 16, further including means for driving the cam shafts from an engine crankshaft.

18. A cylinder head assembly as set forth in claim 17, wherein means for driving the cam shaft comprises first driving means for driving one of the cam shafts from the other cam shaft and second driving means for driving the one of the cam shafts from the engine crankshaft.

19. A cylinder head assembly as set forth in claim 15, wherein the engine has a pair of angular related cylinder banks each of which has affixed to it a cylinder head, the cylinder head end wall of one of the cylinder heads being machined away and the other end wall of the other cylinder head being machined away for driving the cam shafts.

20. A cylinder head assembly as set forth in claim 19, wherein the end walls further have oppositely facing surfaces disposed at different distances from the end walls for forming a cam drive chamber in which the cam shaft drive is contained, the distance between the oppositely facing surfaces and the center of the cylinder head being equal to the stagger between the cylinder banks.

21. A cylinder head assembly as set forth in claim 20, wherein the cylinder head surfaces are formed with at least one exhaust valve seat the flow through which is controlled by at least one popper type exhaust valve and further including a second cam shaft for operating the exhaust popper valves, said end walls forming further bearing recesses for journaling respective bearing surfaces formed on said exhaust cam shaft and which terminate inwardly of the outer surfaces of said end walls, the at least one of said end walls machined away portion also causing the bearing recess for the exhaust cam shaft to pass completely through said one end wall for driving of said exhaust cam shaft.

22. A cylinder head assembly as set forth in claim 21, further including means for driving the cam shafts from an engine crankshaft.

23. A cylinder head assembly as set forth in claim 22, wherein means for driving the cam shaft comprises first driving means for driving one of the cam shafts from the other cam shaft and second driving means for driving the one of the cam shafts from the engine crankshaft.

24. A cylinder head assembly as set forth in claim 15, wherein the end walls further have oppositely facing surfaces disposed at different distances from the end walls for forming a cam drive chamber in which the cam shaft drive is contained, the distance between the oppositely facing surfaces and the center of the cylinder head being equal to the stagger between the cylinder banks.

25. A cylinder head assembly for an internal combustion engine for use with a cylinder block in either of two 180° displaced positions relative to each other, said cylinder head assembly forming a plurality of exhaust ports extending along one side thereof and a plurality of intake ports extending along the other side thereof, said cylinder head assembly defining a pair of end walls extending uninterruptedly between said sides at the ends thereof to define a valve actuating chamber for receiving and journaling at least one cam shaft for operating valves associated with said ports, each of said end walls forming a bearing recess for journaling a respective bearing surface formed on the cam shaft, said bearing surfaces terminating inwardly of the outer surfaces of said end walls, only one of said end walls having a portion machined away so that the respective bearing recess at the end thereof extends completely through said one end wall for passing an end of said cam shaft for driving of said cam shaft.

26. A cylinder head assembly as set forth in claim 25, wherein the cylinder head surfaces are formed with at least one exhaust valve seat the flow through which is controlled by at least one popper type exhaust valve and further including a second cam shaft for operating the exhaust popper valves, said end walls forming further bearing recesses for journaling respective bearing surfaces formed on said exhaust cam shaft and which terminate inwardly of the outer surfaces of said end walls, said end wall machined away portion also causing the bearing recess for the exhaust cam shaft to pass completely through said one end wall for driving of said exhaust cam shaft.

27. A cylinder head assembly as set forth in claim 26, further including means for driving the cam shafts from an engine crankshaft.

28. A cylinder head assembly as set forth in claim 27, wherein means for driving the cam shaft comprises first driving means for driving one of the cam shafts from the other cam shaft and second driving means for driving the one of the cam shafts from the engine crankshaft.

29. A cylinder head assembly as set forth in claim 25, wherein the engine has a pair of angular related cylinder banks each of which has affixed to it a cylinder head where the cylinder head end wall of one of the cam shafts being machined away and the other end wall of the other cylinder head being machined away for driving the cam shafts.

30. A cylinder head assembly as set forth in claim 29, wherein the cylinder heads further have oppositely facing surfaces disposed at different distances from the respective cylinder head end walls for forming a cam drive chamber at one end of the cylinder head in which the cam shaft drive is contained, the difference in the distance between the oppositely facing surfaces and the center of the cylinder head being equal to the stagger between the cylinder banks.

31. A cylinder head assembly as set forth in claim 30, wherein the cylinder head surfaces are formed with at least one exhaust valve seat the flow through which is controlled by at least one popper type exhaust valve and further including a second cam shaft for operating the exhaust popper valves, said end walls forming further bearing recesses for journaling respective bearing surfaces formed on said exhaust cam shaft and which terminate inwardly of the outer surfaces of said end walls, the end wall machined away portion also causing the bearing recess for the exhaust cam shaft to pass completely through said one end wall for driving of said exhaust cam shaft.

32. A cylinder head assembly as set forth in claim 31, further including means for driving the cam shafts from an engine crankshaft.

33. A cylinder head assembly as set forth in claim 32, wherein means for driving the cam shaft comprises first driving means for driving one of the cam shafts from the other cam shaft and second driving means for driving the one of the cam shafts from the engine crankshaft.

34. A cylinder head assembly as set forth in claim 25, wherein the cylinder heads further have oppositely facing surfaces disposed at different distances from the respective cylinder head end walls for forming a cam drive chamber at one end of the cylinder head in which the cam shaft drive is contained, the difference in the distance between the oppositely facing surfaces and the center of the cylinder head being equal to the stagger between the cylinder banks.

35. A method of making a cylinder head assembly for an internal combustion engine for use with a cylinder block in either of two 180° displaced positions relative to each other, said method comprising the steps of forming a cylinder head assembly with a plurality of exhaust ports extending along one side thereof and a plurality of intake ports extending along the other side thereof, said cylinder head assembly defining a pair of end walls extending uninterruptedly between said sides at the ends thereof to define a valve actuating chamber for receiving and journaling at least one cam shaft for operating valves associated with at least some of said ports, each of said end walls forming a bearing recess for journaling a respective bearing surface formed on the cam shaft, said bearing surfaces terminating inwardly of the outer surfaces of said end walls, and machining a portion of only one of said end walls away so that the respective bearing recess at the end thereof extends completely through said one end wall for passing an end of said cam shaft for driving of said cam shaft.

36. A method of making a cylinder head assembly as set forth in claim 35, further including a second cam shaft for operating valves associated with other of the ports, said end walls forming further bearing recesses for journaling respective bearing surfaces formed on said exhaust cam shaft and which terminate inwardly of the outer surfaces of said end walls, the end wall machined away portion also causing the bearing recess for the exhaust cam shaft to pass completely through said one end wall for driving of said exhaust cam shaft.

37. A method of making a cylinder head assembly as set forth in claim 36, further including means for driving the cam shafts from an engine crankshaft.

38. A method of making a cylinder head assembly as set forth in claim 37, wherein means for driving the cam shaft comprises first driving means for driving one of the cam shafts from the other cam shaft and second driving means for driving the one of the cam shafts from the engine crankshaft.

39. A method of making a cylinder head assembly as set forth in claim 35, wherein the engine has a pair of angular related cylinder banks each of which has affixed to it a cylinder head where the cylinder head end wall of one of the cam shafts being machined away and the other end wall of the other cylinder head being machined away for driving the cam shafts.

40. A method of making a cylinder head assembly as set forth in claim 39, wherein the cylinder heads further have oppositely facing surfaces disposed at different distances from the respective cylinder head end walls for forming a cam drive chamber at one end of the cylinder head in which the cam shaft drive is contained, the difference in the distance between the oppositely facing surfaces and the center of the cylinder head being equal to the stagger between the cylinder banks.

41. A method of making a cylinder head assembly as set forth in claim 40, further including a second cam shaft for operating valves associated with other of the ports, said end walls forming further bearing recesses for journaling respective bearing surfaces formed on said exhaust cam shaft and which terminate inwardly of the outer surfaces of said end walls, the end wall machined away portion also causing the bearing recess for the exhaust cam shaft to pass completely through said one end wall for driving of said exhaust cam shaft.

42. A method of making a cylinder head assembly as set forth in claim 41, further including means for driving the cam shafts from an engine crankshaft.

43. A method of making a cylinder head assembly as set forth in claim 42, wherein means for driving the cam shaft comprises first driving means for driving one of the cam shafts from the other cam shaft and second driving means for driving the one of the cam shafts from the engine crankshaft.

44. A method of making a cylinder head assembly as set forth in claim 35, wherein the cylinder heads further have oppositely facing surfaces disposed at different distances from the respective cylinder head end walls for forming a cam drive chamber at one end of the cylinder head in which the cam shaft drive is contained, the difference in the distance between the oppositely facing surfaces in the center of the cylinder head being equal to the stagger between the cylinder banks.

* * * * *